(No Model.)
L. E. CLAWSON & J. A. McKERRON.
SULKY BRAKE.
No. 520,877. Patented June 5, 1894.
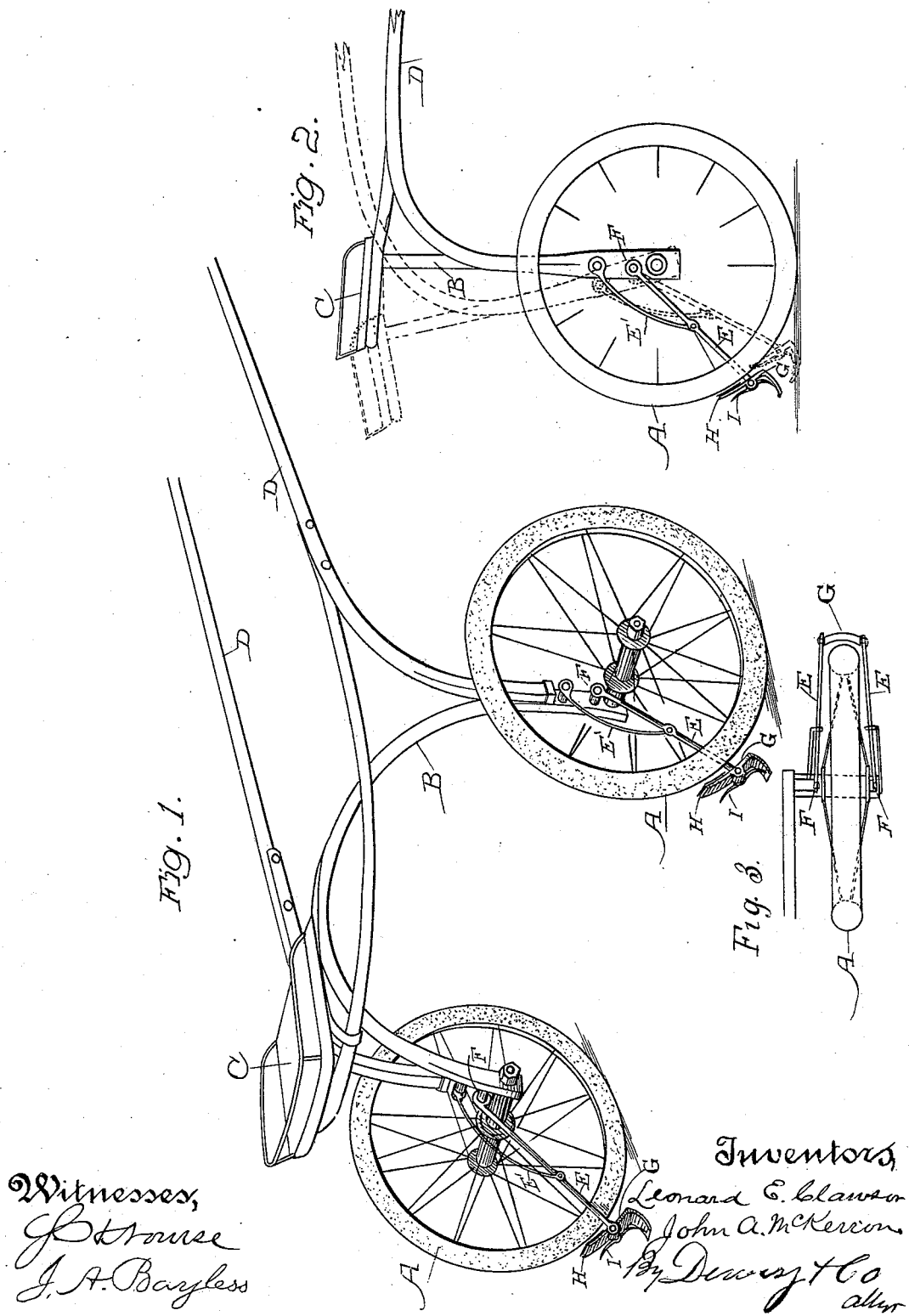

UNITED STATES PATENT OFFICE.

LEONARD E. CLAWSON AND JOHN A. McKERRON, OF SAN FRANCISCO, CALIFORNIA.

SULKY-BRAKE.

SPECIFICATION forming part of Letters Patent No. 520,877, dated June 5, 1894.

Application filed February 6, 1894. Serial No. 499,273. (No model.)

*To all whom it may concern:*

Be it known that we, LEONARD E. CLAWSON and JOHN A. McKERRON, citizens of the United States, residing in the city and county of San Francisco, State of California, have invented an Improvement in Sulky-Brakes; and we hereby declare the following to be a full, clear, and exact description of the same.

Our invention relates to a brake for driving and racing sulkies, carts, and two-wheeled vehicles.

It consists in certain details of construction which will be more fully explained by reference to the accompanying drawings, in which—

Figure 1 shows our invention applied to a racing sulky. Fig. 2 is a side elevation of our improved brake. Fig. 3 shows the brake supported by two arms.

The object of our invention is to provide an automatically operating attachment whereby the wheels of a sulky or other two-wheeled vehicle may be instantly locked whenever the horse attempts to rear, and thus to prevent the vehicle from running under the horse and throwing him over backward.

In the use of what are known as bicycle sulkies, low wheels are employed and an arched frame is carried up between the wheels so as to form an elevated attachment for the shafts, and a support for the driver's seat at a suitable height relative to that of the horse. As long as the horse continues in his proper position, this construction is satisfactory, but with a vicious horse, or one which is inclined to rear, the moment he rises so as to tilt the shafts upward, the tendency is to run the wheels under the horse to such an extent as to throw him over backward and cause serious injury. Our invention is designed to prevent such an accident.

A A are the wheels of the vehicle.

B is the arch frame rising between the wheels and supporting the seat C and having the shafts D attached to it in a suitable manner and extending forward so as to be connected with the horse. The journals of the wheels extend horizontally outward from the lower outer ends of the arch frame.

E E are arms connected at F with the arch frame B at points above the wheel centers, and E' are brace levers connected with the arms E and with the frame at points above the attachment of the arms E. The arms E incline downward and backward so that their outer ends stand normally a little above the ground, when the horse and shafts are in their proper position. Upon the outer ends of the arms E are pivoted the brake levers G which are normally held by springs I at a distance from the rim or frictional surface against which they are to operate, and when the vehicle is in its proper position, they do not touch the frictional surface or in any way impede the movements of the vehicle. The upper ends of these levers extend above the fulcrum points, and carry shoes H which are adapted to press against the wheel rims when desired, but they are normally held out of contact by springs. The lower ends of these levers extend downward some distance below the point of attachment to the arms E, but normally above the ground so as not to touch during the ordinary movements of the horse and vehicle.

The operation will then be as follows: The normal position of the vehicle is shown in full lines in which the brake is carried at a sufficient distance from the periphery of the wheel, and its lever out of contact with the ground. When the shafts of the vehicle are lifted up, the arch B is also thrown backward, and as the rods E and braces E' are connected with the arch at a point above the wheel centers, it will be seen that the brake lever will be depressed in proportion as the shafts are raised, and instantly brought into contact with the ground. This acts to force the brake shoe against the wheel, thus locking the wheel and preventing its moving forward so as to run under the horse. As soon as the horse comes down again upon his feet, the lever will be lifted from the ground, and the brake will be thrown out of contact with the rim by the spring, and the vehicle is in condition to be drawn forward or moved backward without any impediment by reason of the brake.

It will be manifest that the brake H may be applied directly to the periphery of the wheel, or it may act upon a rim or drum of smaller diameter concentric with the wheel, the action being in either case the same.

Having thus described our invention, what we claim as new, and desire to secure by Letters Patent, is—

1. The combination, with a two wheeled vehicle, of an arm connected with the vehicle at a point eccentric to the wheel center, and extending downwardly so that it will stand normally out of contact with the ground, and a lever upon the lower portion of said arm provided with a brake surface, adapted to be thrown into contact with the wheel when the frame is raised to force the lever into contact with the ground.

2. The combination with a two-wheeled vehicle of an arm connected with the vehicle frame above the line of the wheel axis, and extending downwardly to the rear, a lever centrally fulcrumed to the arm, having one end extending downward to make contact with the ground when the animal rears, and a brake shoe attached to the opposite end so as to be forced against the wheel by such contact, substantially as herein described.

In witness whereof we have hereunto set our hands.

LEONARD E. CLAWSON.
    JOHN A. McKERRON.

Witnesses:
 S. H. NOURSE,
 J. A. BAYLESS.